(12) United States Patent
Takahashi

(10) Patent No.: US 6,295,099 B1
(45) Date of Patent: *Sep. 25, 2001

(54) INFORMATION RECORDING AND REPRODUCING APPARATUS

(75) Inventor: Koji Takahashi, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/345,863

(22) Filed: Nov. 28, 1994

Related U.S. Application Data

(63) Continuation of application No. 08/027,381, filed on Mar. 8, 1993.

(30) Foreign Application Priority Data

Mar. 12, 1992 (JP) ..................................... 4-053694

(51) Int. Cl.⁷ ................................................. H04N 5/907
(52) U.S. Cl. ............................................. 348/715; 348/716
(58) Field of Search ...................... 348/714–718, 348/559, 460, 231, 232, 233; 386/77, 95, 108, 109, 112, 121, 124, 125; H04N 5/907

(56) References Cited

U.S. PATENT DOCUMENTS

| | | | |
|---|---|---|---|
| 4,272,787 | * 6/1981 | Michael et al. | 348/559 |
| 5,153,726 | * 10/1992 | Billing | 348/716 |
| 5,329,320 | * 7/1994 | Yifroch . | |
| 5,371,551 | * 12/1994 | Logan et al. | 348/714 |
| 5,434,568 | * 7/1995 | Moll | 341/87 |
| 5,438,423 | * 8/1995 | Lunch et al. . | |
| 5,465,120 | * 11/1995 | Schultheiss | 348/714 |
| 5,467,081 | * 11/1995 | Drews et al. | 340/825.34 |
| 5,523,799 | * 6/1996 | Hattori et al. | 348/715 |
| 5,555,463 | * 9/1996 | Sterun | 348/715 |

FOREIGN PATENT DOCUMENTS

| | | | |
|---|---|---|---|
| 2160740 | * 12/1985 | (GB) | 358/36 |
| 62-269581 | * 11/1987 | (JP) | H04N/5/907 |
| 64-41579 | * 2/1989 | (JP) | H04N/5/907 |
| 2-125586 | * 9/1990 | (JP) | H04N/5/907 |
| 2-222385 | * 9/1990 | (JP) | H04N/5/907 |
| 0034685 | * 2/1991 | (JP) . | |
| 3-26078 | * 2/1991 | (JP) | H04N/5/907 |
| 0002093 | * 10/1980 | (WO) | 348/460 |

OTHER PUBLICATIONS

Crook et al., "Solid State Video Recorder" 1988 International Broadcasting Convention, Metopole Conference and Exhibition Centre, Brighton, UK 23–27 September 1988 pp. 422–424.*

Woodham, D, "A Solid State Action Reply Recorder" 16ᵗʰ International TV Symposium, Montreux, Switzerland 17–22 Jun. 1989 pp. 289–295.*

* cited by examiner

Primary Examiner—David E. Harvey
(74) Attorney, Agent, or Firm—Robin, Blecker & Daley

(57) ABSTRACT

An information recording and reproducing apparatus includes a solid-state memory medium for memorizing serial moving-image information and a reproducing circuit for reproducing a plurality of pieces of moving-image information from the solid-state memory medium in parallel.

11 Claims, 6 Drawing Sheets

$A_i = (M-b) \cdot (i-1)/N$

INFORMATION RECORDING AND REPRODUCING APPARATUS

This is a continuation application under 37 CFR 1.62 of prior application Ser. No. 08/027,381, filed Mar. 8, 1993, now pending.

BACKGROUND OF THE INVENTION

1. Field of the Invention

The present invention relates to recording and reproduction of moving-image information and, more particularly, to an apparatus having an improved information search function.

2. Description of the Related Art

Conventionally, it has been in general to employ a so-called VTR (video tape recorder) which uses magnetic tape having a tape width of ½ inch or 8 mm for recording moving-image information.

Such a VTR is arranged to record and reproduce video information for one field per track on and from magnetic tape wrapped around a rotary drum by means of a rotary head provided on the rotary drum.

A search operation utilizing the VTR is commonly performed while recorded video information is actually being reproduced by utilizing various functions using an index signal for cueing a video scene, such as "fast forward feed", "rewinding control" and "special reproduction".

However, since the video information is recorded on a tape-shaped recording medium (magnetic tape), the time taken to transport the magnetic tape is needed to search a desired video image, with the result that time-consuming and exhausting operations are occasionally needed to carry out the search operation.

Also, during the search operation, the magnetic tape is traced by the rotary head which is repetitively instantaneously forced against the magnetic tape on which the video information is recorded. Accordingly, the search operation offers the problem of abrading or scratching the recording medium to adversely affect the reliability of the recorded information.

Another problem is that if such information is recorded in an analog signal format, duplication (copy/dubbing) of the information involves deterioration of signals.

In recent years, technical innovations in semiconductors have been remarkable, and the memory capacity per memory chip has become four times at intervals of three years. The prices of the semiconductors will markedly decrease owing to the effects of mass production.

Also, various compression arts for compressing information have been proposed.

If the above-described situations are considered, in the near future, it will become possible in practice to store moving-image information into semiconductor memories into which still-image information can only be written at the present.

SUMMARY OF THE INVENTION

It is, therefore, an object of the present invention to provide an information recording and reproducing apparatus which is capable of memorizing moving-image information by using a large-capacity solid-state memory medium and which makes it possible to search video information with improved efficiency and at high speed during various-speed search, editing or other moving-image information processing.

To achieve the above-described object, according to one aspect of the present invention, there is provided an information recording and reproducing apparatus which includes a semiconductor memory medium for memorizing serial moving-image information and reproducing means for reproducing a plurality of pieces of moving-image information from the semiconductor memory medium in parallel.

In accordance with one aspect of the present invention, since it is possible to reproduce recorded moving-image information as a plurality of pieces of image-image information in parallel, it is possible to rapidly grasp the recorded moving-image information, whereby it is possible to easily access desired image information during search or other similar operations.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
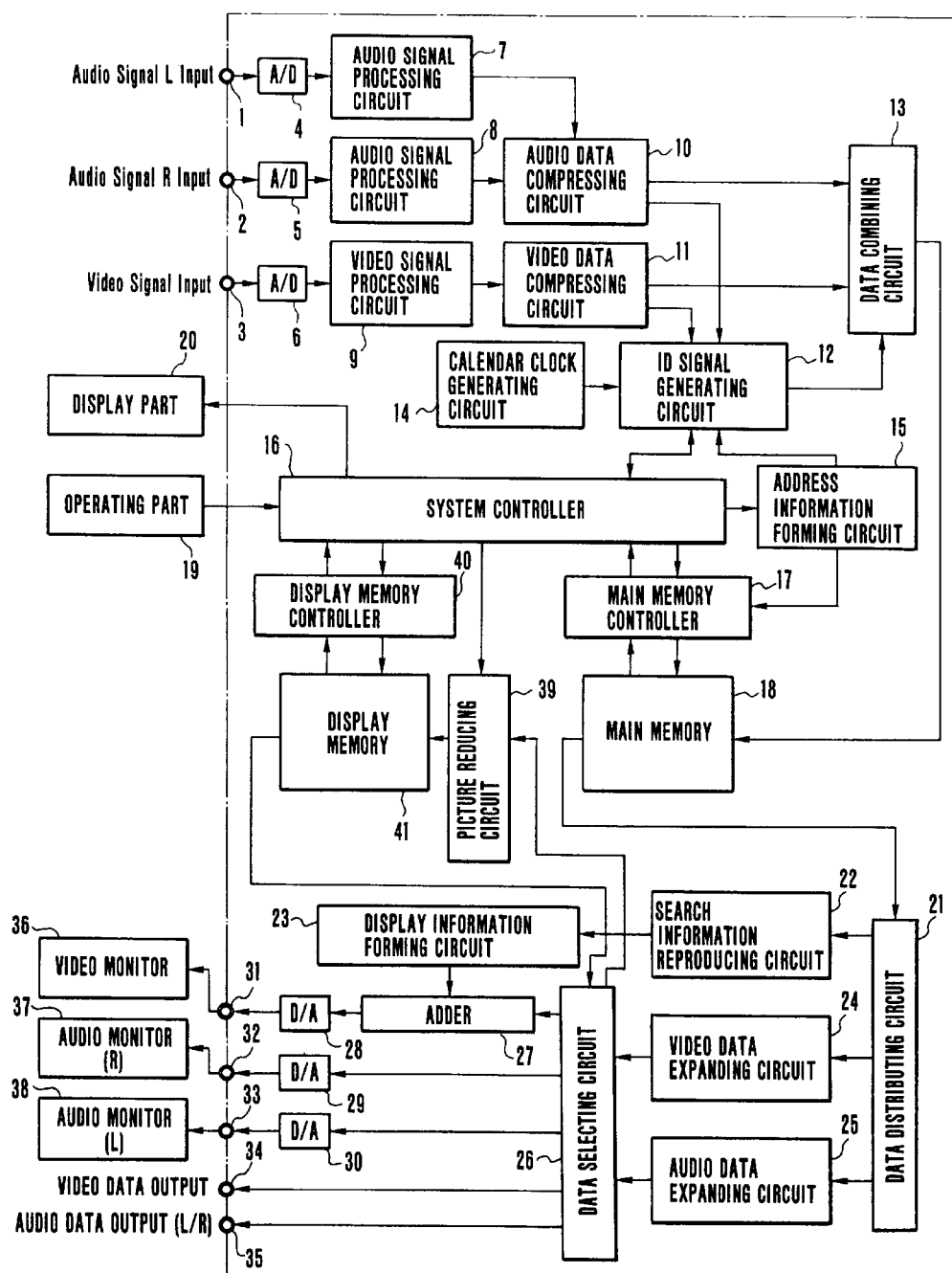
FIG. 1 is a schematic block diagram of an image information recording and reproducing apparatus according to one embodiment of the present invention.

FIG. 1 is a block diagram schematically showing an image information recording and reproducing apparatus according to a first embodiment of the present invention.

The operation of recording video information and audio information will be described below with reference to FIG. 1.

Analog audio signals on right and left channels are respectively inputted through audio signal input terminals 1 and 2 and converted into digital audio signals by corresponding A/D converters 4 and 5.

The digital audio signals are respectively subjected to predetermined processings, such as predetermined kinds of noise reductions, level adjustment and band limitation, by audio signal processing circuits 7 and 8. The digital audio signal outputs of the audio signal processing circuits 7 and 8 are inputted to an audio data compressing circuit 10, in which they are subjected to a data compression processing, such as subband coding utilizing, for example, the frequency masking effect of an auditory sense.

In the meantime, an analog video signal inputted through a video signal input terminal 3 is converted into a digital video signal by the A/D converter 6.

After the digital video signal has been passed through a video signal processing circuit 9, the amount of data carried by the digital video signal is compressed to approximately one over several tens to approximately one over several hundreds by a video data compressing circuit 11.

The compression method can be implemented, as by suitably combining a plurality of kinds of processings such as an interframe correlation processing using a temporal image correlation, motion vector compensation for suppressing degradation of image quality due to the compression method, and double-sided predictive interframe compression which is applied to frames which appear before and after (in the past and future) with reference to a time axis. More specifically, according to an algorithm called MPEG 1, which is proposed by the MPEG (Moving Picture Image Coding Experts Group), it is possible to ensure standard image quality substantially equal to the image quality of a general ½-inch VTR. Details of the compression processing are disclosed in "NIKKEI NEW MEDIA" (Special Edition), Mar. 4, 1991, pages 13 to 24.

Then, data from an ID signal generating circuit 12 which will be described later and the audio and video data from the respective audio and video data compressing circuits 10 and 11 are combined by a data combining circuit 13, and the combined data is stored into a main memory 18.

Memory address control, read/write control and other control are provided over the main memory 18 by a memory controller 17.

The memory controller 17 is controlled by the system controller 16, and the system controller 16 executes control for the entire apparatus, such as control of operation switching.

If an instruction, such as "RECORD", "REPRODUCE" or "SEARCH", is inputted to the system controller 16 from an operating part 19, then the system controller 16 executes the aforesaid controls over the memory controller 17 and, simultaneously, displays various information such as information indicative of the operation status of the system controller 16 and a time code or the like indicative of a recording/reproducing time or the like. The system controller 16 also transmits the various information such as the time code or the like to an address information forming circuit 15.

The time code is mainly divided into two kinds. The first kind of time code indicates the time which has elapsed from the start of a recording medium or a video program, the cumulative time of camera photography, etc., while the second kind of time code indicates the date (year/month/day) or the time (hour/minute/second) when a recording or camera photography was performed, the time instant when each frame was recorded, and others. To generate the second kind of time code, a calendar clock generating circuit 14 is provided.

The address information forming circuit 15 receives data, such as status data about information storage, from the memory controller 17 via the system controller 16, and transfers the received data to the ID signal generating circuit 12 as information indicative of the amount of data in each information.

The contents of the data transferred to the ID signal generating circuit 12 include, for example, the time code, the selected modes of image quality and sound quality, etc., which are based on the information from the system controller 16, the amount of data (the length of data, in the case of variable-length coding) in the video information or the audio information and the value of the leading address of a memory location into which the data is stored, the amount of data and the value of the leading address being obtained on the basis of the information from the memory controller 17. The ID signal generating circuit 12 groups the received data into one set of data for each ID signal, and the data combining circuit 13 combines the one set of data with the corresponding video and audio information, thereby preparing one data block. The data blocks thus prepared are stored into the main memory 18 and the leading addresses of the memory locations of the main memory 18 in which the respective data blocks are stored are sequentially written into an ID file.

One example of data storage in the main memory 18 made from a solid-state memory will be described in detail below with specific reference to FIG. 2.

Figure 2:
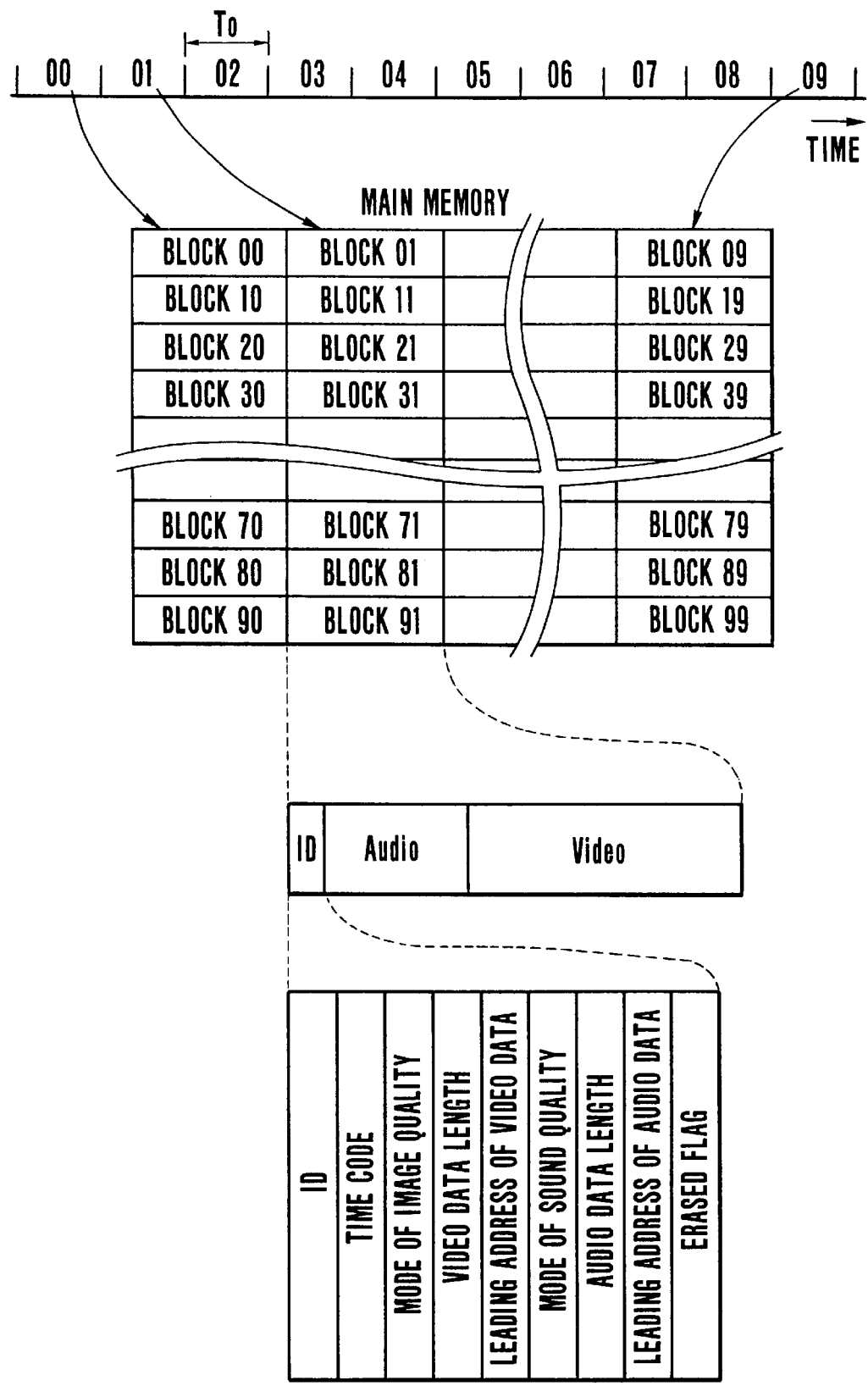
FIG. 2 is a conceptual diagram of a data arrangement according to the embodiment of the present invention.

The top horizontal axis of FIG. 2 represents a time axis, and shows the manner in which ID signals are formed at intervals of a predetermined time ($T_0$).

The middle part of FIG. 2 shows a conceptual diagram of the address space of the main memory 18.

After each of the ID signals, the corresponding video data and audio data are sequentially stored as ID data.

The ID data has a fixed length and contains a total of eight kinds of basic information in the present embodiment (refer to the bottom part of FIG. 2).

The ID data contains, for example, a block number, a time code according to the SMPTE (Society of Motion Picture and Television Engineers), data about a coding mode indicative of image quality and sound quality which have been selected based on a trade-off with recording time, the leading address and amount of each of AV (audio and video) data, and an erased flag.

When stored data are to be erased, the erased flag serves to set the stored data to a recoverable, logical erased state and disable normal reproduction before physical deletion is executed.

The ID data having the above-described construction, the video data and the audio data constitute one data block.

A reproducing operation for reproducing the video and audio information recorded in the above-described manner will be described below with reference to FIG. 1.

If a reproducing operation is specified at the operating part 19, the system controller 16 displays on the display part 20 a message to the effect that the reproducing operation is being performed. The memory controller 17 controls the memory addresses and read/write operations of the main memory 18 to read from the main memory 18 the information signals stored by the aforesaid recording operation (the video information, the stereophonic audio information and the ID information required to search such information).

The three kinds of data are supplied to a data distributing circuit 21 in a mixed state (in the state of serial data). In this data format, it is possible to adopt a memory arrangement which allows for extension of the main memory 18 or exchange of IC cards.

The three kinds of data are distributed by the data distributing circuit 21 in the following manner.

A search information reproducing circuit 22 outputs the above-described ID information for each block, as shown in FIG. 2, and display information for a video monitor 36 is generated by a display information forming circuit 23. The display information and the restored video information outputted from a data selecting circuit 26 which will be described later are combined by an adder 27.

The thus-combined information is converted into a versatile analog signal by a D/A converter 28, and the versatile analog signal is visually displayed on the video monitor 36 through an output terminal 31.

The video information from the data distributing circuit 21 is inputted to a video data expanding circuit 24, and the video data expanding circuit 24 subjects the video information to a data expansion processing opposite to the compression processing executed during the recording, thereby reproducing a video signal equivalent to the video signal inputted during the recording.

The reproduced video signal is inputted to the data selecting circuit 26, and the data selecting circuit 26 outputs the reproduced video signal to the digital video output terminal 34 and to the adder 27 for combining the reproduced video signal and the display information into a display signal for the video monitor 36.

Meanwhile, the audio information is inputted from the data distributing circuit 21 to an audio data expanding circuit 25. Similarly to the case of the video information, the audio data expanding circuit 25 subjects the audio information to a data expansion processing opposite to the compression processing executed during the recording, thereby reproducing an audio signal equivalent to the audio signal inputted during the recording.

The reproduced audio signal is inputted to the data selecting circuit 26, and the data selecting circuit 26 outputs the reproduced stereophonic, right-channel (R) and left-channel (L) audio signals to the respective D/A converters 29 and 30 and to the digital audio output terminal 35.

The audio signal outputted from the D/A converter 29 is outputted to an audio monitor (R) 37 through an output terminal 32, while the audio signal outputted from the D/A converter 30 is outputted to an audio monitor (L) 38 through an output terminal 33.

The above description has referred to the reproduced video signal as if it were outputted from the data selecting circuit 26 directly to the adder 27 and to the digital video output terminal 34 and the like. However, in practice, a picture reducing circuit 39 applies image processings such as image reduction to the reproduced video signal, as required, and the reproduced video signal is, therefore, outputted to the adder 27 via the display memory 41 for the purpose of correcting the deviation between the reproduced video signal and the corresponding audio signal due to the delay time required to process the reproduced video signal.

The search operation of the image information recording and reproducing apparatus having the above-described arrangement will be described below.

Figure 3:
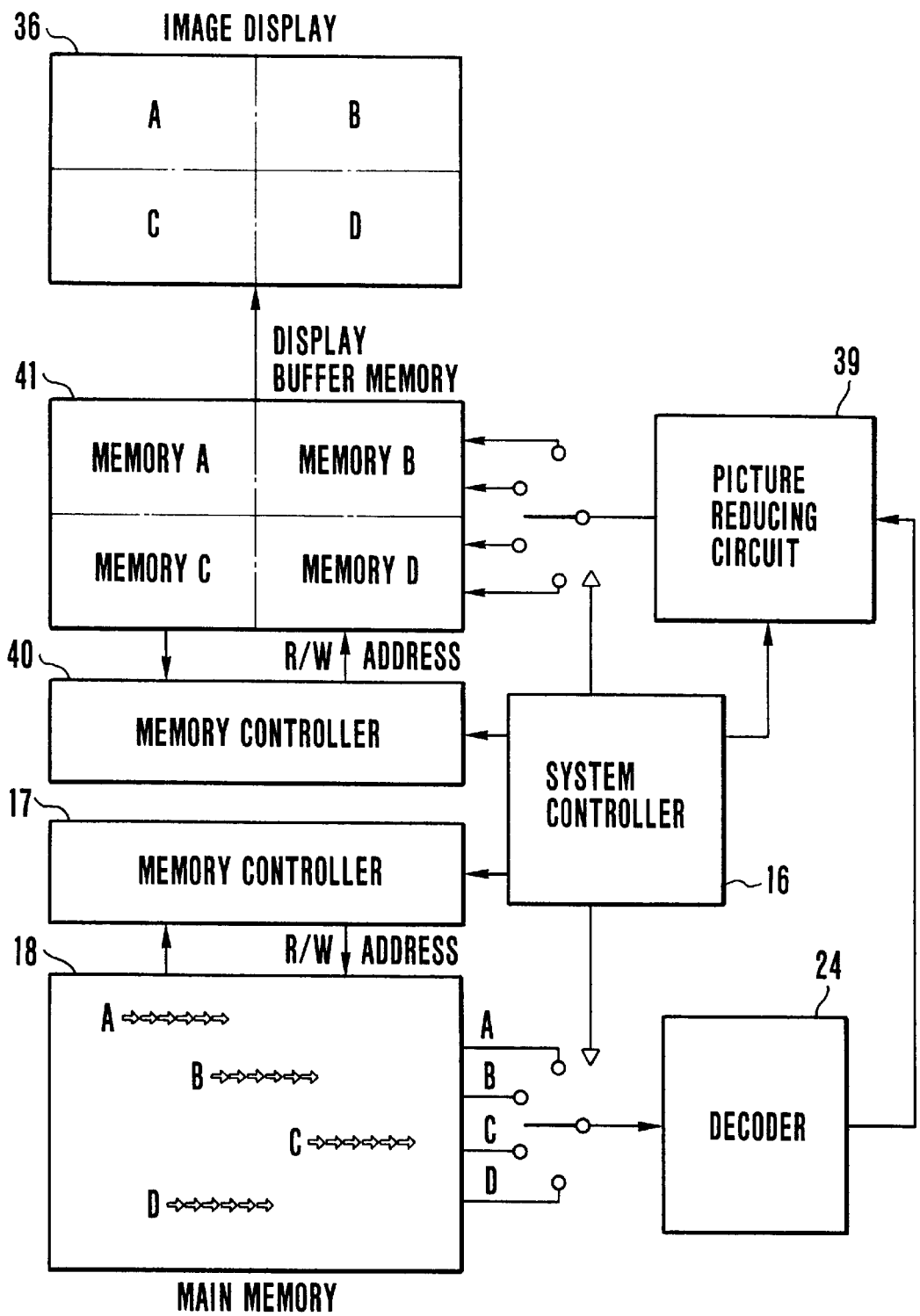
FIG. 3 is a conceptual diagram of a picture display for searching according to the embodiment of the present invention.

FIG. 3 shows a conceptual diagram of a picture display associated with the search operation.

The video data stored in the main memory 18 is read under control of the memory controller 17 which operates in accordance with the system controller 16. The read video data is restored to the original video signal by the decoder 24 (in FIG. 1, the video data expanding circuit).

In the present embodiment, a plurality of pieces of video information are simultaneously visually displayed on the video monitor 36 to ensure efficient search.

Referring to a display method according to the present embodiment, for example, four pictures are simultaneously displayed, and four read-out addresses are set so that four pictures A, B, C and D can be respectively produced.

As a matter of course, the number of divided pictures is not limited to four.

The four read-out addresses corresponding to the respective pictures A, B, C and D are set sequentially and repetitively in a time-division manner. This process is illustrated by the schematic symbol representative of a selecting switch, which is shown in FIG. 3 between the main memory 18 and the decoder 24.

The video signal from the main memory 18 is sequentially reproduced by the decoder 24, and the reproduced video signal is reduced to ¼ by the picture reducing circuit 39 so that four pictures can be simultaneously displayed on one monitor.

The thus-obtained reduced image data are sequentially stored into the display buffer memory (display memory) 41. This sequential storage is illustrated by the schematic symbol representative of a selecting operation, which is shown in FIG. 3 between the picture reducing circuit 39 and the display buffer memory 41. An actual sequential storage operation is performed by the memory controller 40 controlling the addresses of the display buffer memory 41 in accordance with an instruction given by the system controller 16. As shown, the address area of the display buffer memory 41 is divided into four areas A, B, C and D, and the reduced image data are sequentially written into the areas A, B, C and D corresponding to the respective read-out addresses of the main memory 18, in a time-division manner.

Meanwhile, in parallel with the above-described writing operation, the operation of reading the reduced image data from the display memory 41 is performed by sequentially incrementing the address of the display memory 41, in a manner similar to that used during normal scanning of television signals. In the above-described manner, a plurality of pieces of moving-image information are simultaneously visually displayed.

It is to be noted that to realize the above-described operation, in the case of a simultaneous display of N pictures, the main memory 18 needs to be a memory having N multi-ports or a high-speed memory having a read-out speed which is substantially N or more times the read-out speed of the display memory 41.

The number of divided pictures, N, is transmitted from the system controller 16 to the picture reducing circuit 39, and the picture reducing circuit 39 performs a picture reducing processing according to the number of divided pictures, N.

The state of the main memory 18 for the case of an N-divided display will be described below with reference to FIG. 4.

Figure 4:
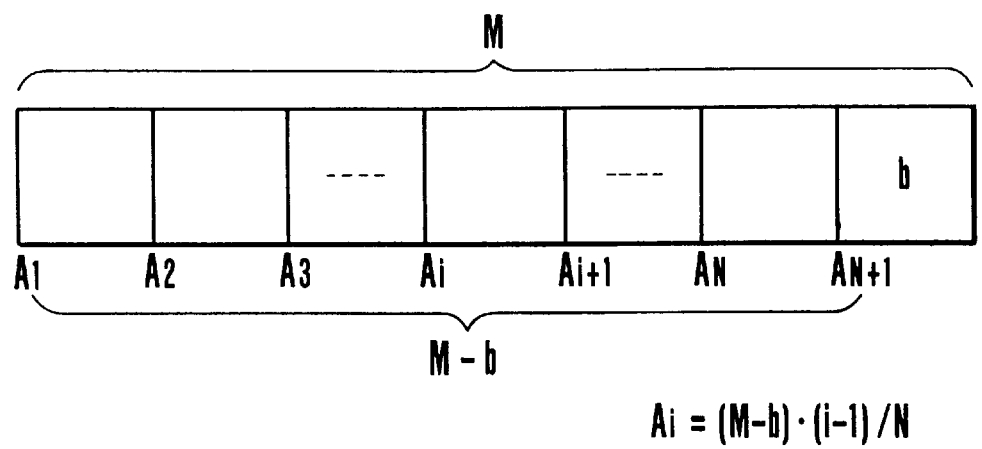
FIG. 4 is a conceptual diagram of memory addresses for display of a plurality of moving images according to the embodiment of the present invention.

FIG. 4 is a conceptual diagram of the leading addresses of individual search areas for the case of a plurality of moving-image displays.

If the entire memory capacity is M and the amount of data corresponding to an unused invalid data (blank) portion is "b", the total amount of data to be searched is "M–b".

This "M–b" is divided into N equal parts, and the leading addresses of the respective N search areas are set in the order of $A_1, A_2, \ldots, A_i, \ldots, A_N$ from address "0" which is the leading address of the first search area. If the leading address of the i-th search area is $A_i$, $A_i$ is defined as follows:

$$Ai=(M-b)\cdot(i-1)/N$$

Reproduction of image data is started at the leading address $A_i$ of the search area which has been set in the above-described manner, and if a predetermined address position in the search area is reached, the process returns to the leading address $A_i$ and the reproducing operation for search is continued.

A loop is formed between the leading address $A_i$ and the predetermined address position, and this loop is repeated to continue the reproducing operation until the next instruction is given.

During this time, if any instruction is issued such as an instruction to cancel the search operation or an instruction to change a search mode (for example, an instruction to change the number of divided pictures, N), the search operation is stopped at an appropriate timing and the current mode is transferred to a predetermined operation.

Figure 5:
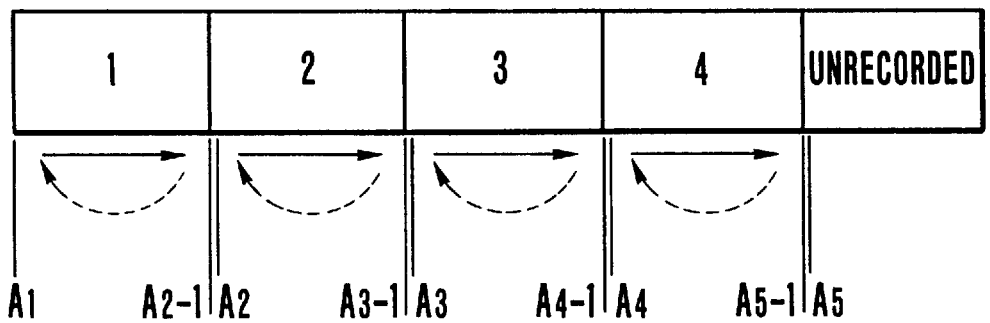
FIG. 5 is a conceptual diagram of address loops for display of a plurality of moving images according to the embodiment of the present invention.

FIG. 5 shows one example of a method for setting the ending address of the above-described search area. In the example shown in FIG. 5, the ending address is set for each of the search areas as an ending address "$A_{(i+1)}-1$" (in the case of N=4).

In the above-described manner, since an unrecorded memory area is excluded from memory areas to be reproduced, it is possible to prevent a meaningless video image from accidentally appearing within a search picture to lower efficiency of search or to visually impair the search picture.

The following description refers to a search method whose efficiency of searching is further improved by using a hierarchical search.

First, a picture relatively near to a desired position to be reproduced is selected from the four pictures which are displayed on the video monitor 36 by the method of the above-described embodiment.

In the following description, reference will be made to a case where the picture A displayed on the video monitor 36 is nearest to, but does not coincide with, the desired position to be reproduced.

The picture A is selected from the four divided pictures by inputting numerical data from the operating part 19 or by means of a graphical interface using a mouse (not shown), a touch panel or the like.

When the picture A is selected, the memory area A in which image data for the picture A is stored is divided into four parts and a finer search becomes possible.

In the above-described manner, by hierarchically selecting pictures near to a desired picture in sequence by several times, it is possible to search the desired position to be reproduced.

Figure 6:
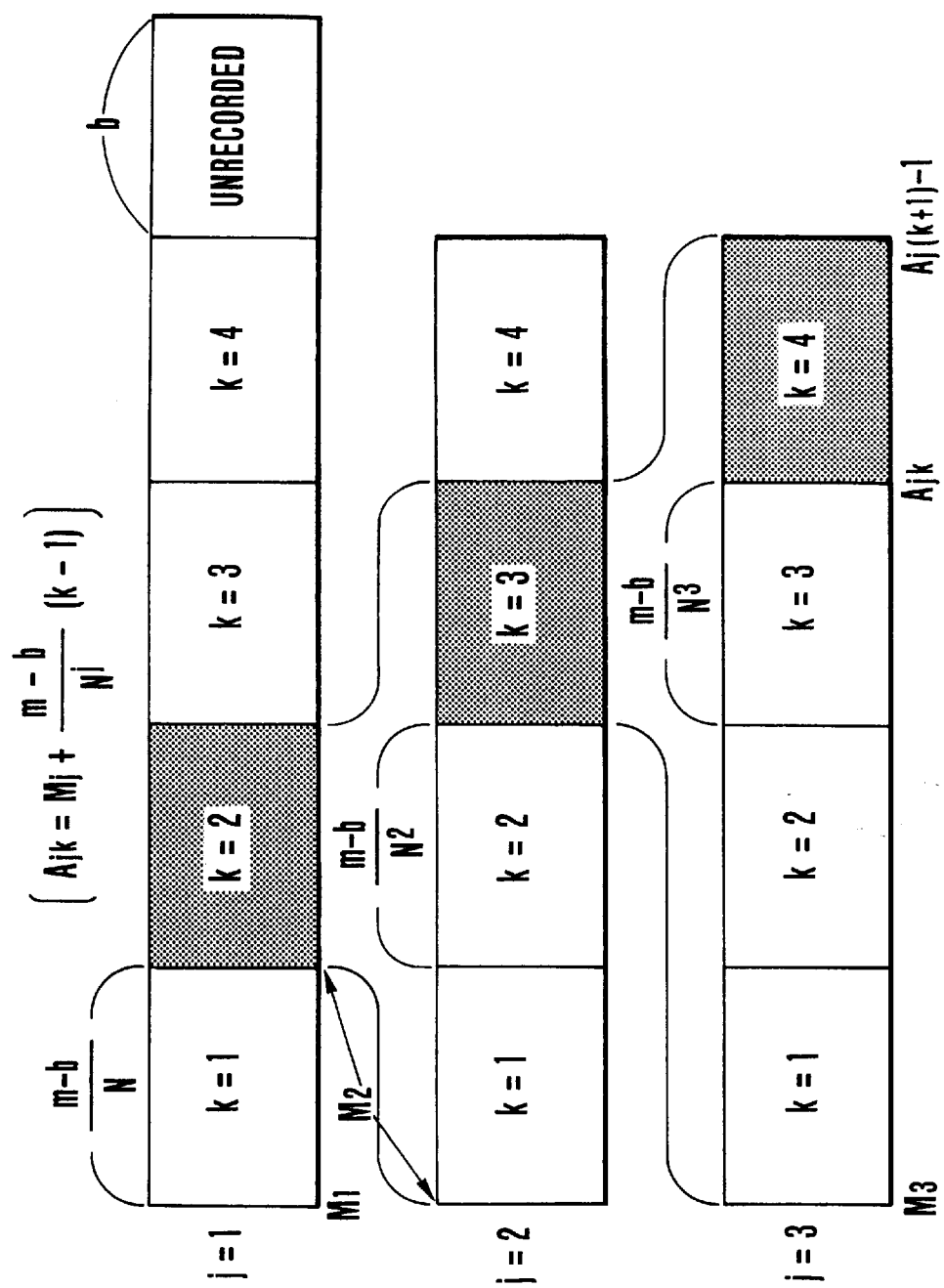
FIG. 6 is a conceptual diagram of address variations for hierarchical searching according to the embodiment of the present invention.

FIG. 6 shows one example in which the above-described search operation is performed three times to search a desired picture. (In the following description, "j" represents the number of times by which the search operation is performed.) The entire memory capacity is hereinafter labeled "m" for the sake of distinction from the above-described entire memory capacity M.

In the first search (j=1), the invalid portion "b" is subtracted from the entire memory capacity "m", and address "0" to address "m−b" are set as the first search area. This first search area is equally divided by the number of divided pictures, N, to obtain the value "(m−b)/N" as a unit search area.

The leading address of the first search area is set as $M_1$, and each of the unit search areas of the first search area is counted in sequence from the leading unit search area to increment the value of a count "k" (where $1 \leq k \leq N$).

If $A_{jk}$ represents the leading address of each of the unit search areas, the following relations are obtained:

if $k=1$, $A_{11}=M_1=0$;

if $k=2$, $A_{12}=1 \cdot (m-b)/N$;

if $k=3$, $A_{13}=2 \cdot (m-b)/N$;

and if $k=4$, $A_{14}=3 \cdot (m-b)/N$.

If the above relations are generalized, the following relation is obtained:

$A_{1k}=M_1+(k-1) \cdot (m-b)/N$.

If the second unit search area is selected, the process proceeds to the next step.

This selected unit search area (k=2) is set as a target area for the next search operation, the leading address of the target area is set as $M_2$.

In the second search (j=2), the first search area (m−b)/N is further equally divided by N to obtain "$(m-b)/N^2$" as a unit search area.

If $A_{jk}$ represents the leading address of each of the unit search areas, the following relations are obtained:

if $k=1$, $A_{21}=M_2$;

if $k=2$, $A_{22}=M_2+1 \cdot (m-b)/N^2$;

if $k=3$, $A_{23}=M_2+2 \cdot (m-b)/N^2$;

and if $k=4$, $A_{24}=M_2+3 \cdot (m-b)/N^2$.

If the above relations are generalized, the following relation is obtained:

$A_{2k}=M_2+(k-1) \cdot (m-b)/N^2$.

If further generalization is performed, the leading address $A_{jk}$ of each of the unit search areas is expressed as:

$A_{jk}=M_j+(m-b) \cdot (k-1)/N^j$.

If the third unit search area is selected, the process proceeds to the next step.

In the third search (j=3), the second search area $(m-b)/N^2$ is further equally divided by N to obtain "$(m-b)/N^3$" as a unit search area.

Generally speaking, the leading addresses $A_{jk}$ of the respective unit areas and the ending address "$A_{j(k+1)}-1$" each constitute the leading address of the k-th search area in the j-th search operation.

Each time the above-described search operation is repeated, N reduced pictures are formed by dividing the area shown by dots in FIG. 6 obtained during the immediately previous search operation and are displayed on a monitor television screen.

In the above-described manner, the search operation is continued while target image information is being switched in succession.

Since it is possible to simultaneously verify all areas in the valid data of a memory package, the search operation can be performed extremely rapidly.

In particular, in a case where an exact key word for search is not known, it is possible to search target information smoothly and easily since it is possible to gradually approach the target information.

Figure 7:
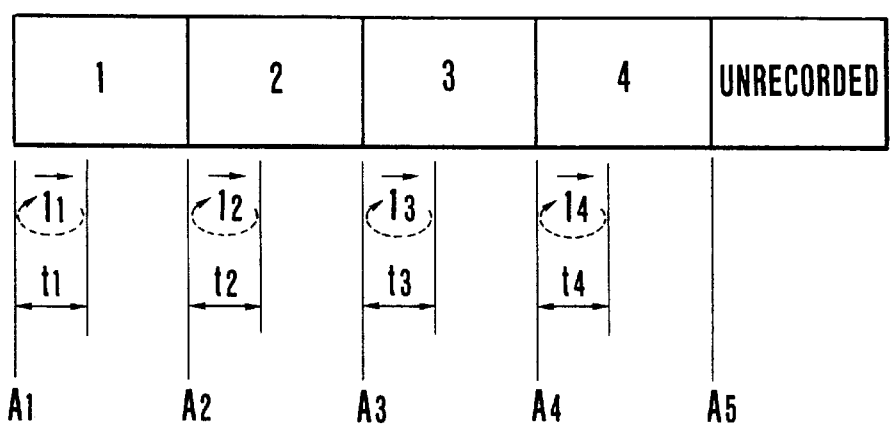
FIG. 7 is a conceptual diagram of address loops for display of a plurality of moving images according to another embodiment of the present invention.

As a method for setting the ending addresses in accordance with the present embodiment, the above description refers to the example in which when address counting for each of the unit search areas reaches the address "$A_{(i+1)}-1$", the address is set as an ending address of each of the unit search areas. As another embodiment, a reproduction repetition unit of predetermined time $t_i$ may be set for each search area (refer to FIG. 7 (the example of N=4)), or the unit times of all search areas may be made constant and they may be globally set so that they can be managed simply by a timer or the like.

Figure 8:
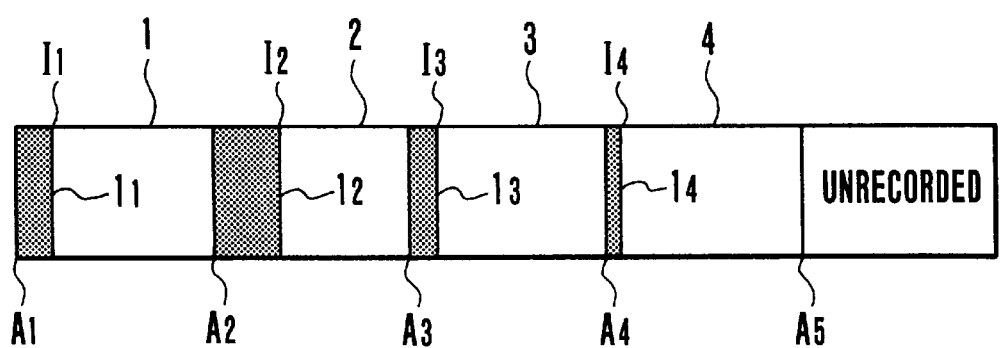
FIG. 8 is a conceptual diagram of address loops for display of a plurality of moving images according to a further embodiment of the present invention.

In another embodiment, each data area partitioned by index information formed by ID data, etc., may be used as a reproduction unit (refer to FIG. 4 (the example of N=4)). In this embodiment, initial index signals are respectively detected from data areas 1 to 4 and the units of loops are determined on the basis of the respective initial index signals. Referring to FIG. 8, $I_1$ to $I_4$ indicate locations to which index signals are added, and the loops $1_1$ to $1_4$ shown by dots indicate the reproduction repetition units of the respective data areas 1 to 4. Since the index signals are used as partitioning signals, the number of repetitions at meaningless locations can be reduced so that efficient reproduction for a search operation can be realized.

As is apparent from the above description, since each of the present embodiments implements recording and reproduction of moving-image information without using any mechanical members, it is possible to improve the reliability with which recorded information is held. Particularly, since a plurality of pieces of image information can be reproduced in parallel, it is possible to rapidly grasp recorded moving-image information, whereby it is possible to easily access desired image information during searching or other operations.

What is claimed is:

1. A reproducing apparatus comprising:

a reproducing means for reproducing an information signal from a solid-state memory, the information signal being composed of a plurality of blocks each of which has a compressed image signal and additional information for disabling a normal reproduction of the compressed image signal stored in the solid state memory; and expanding means for expanding an information amount of the compressed image signal reproduced from the solid-state memory, wherein the normal reproduction of the image signal from the solid-state memory is disabled according to the additional information of the plurality of blocks.

2. An apparatus according to claim 1, wherein the additional information includes a logical erasing flag.

3. An apparatus according to claim 1, wherein the image signal represents a moving image and the image signal is compressed according to MPEG system.

4. An apparatus according to claim 1, wherein the additional information has a fixed length.

5. A recording apparatus comprising:

compressing means for compressing an information amount of an image signal; and recording means for forming an information signal composed of a plurality of blocks each of which has the compressed image signal and additional information for disabling a normal reproduction of the compressed image signal and for recording the information signal into a solid-state memory, wherein the normal reproduction of the compressed image signal from the solid-state memory is disabled according to the additional information of the plurality of blocks.

6. An apparatus according to claim 5, wherein the image signal represents a moving image and said compressing means compresses the image signal in accordance with MPEG system.

7. An apparatus according to claim 5, wherein the plurality of blocks of the information signal also have an audio signal.

8. An apparatus according to claim 5, wherein the additional information includes a logical erasing flag.

9. An apparatus according to claim 5, wherein the additional information have a fixed length.

10. A recording apparatus comprising:

input means for inputting an image signal representing a moving image;

generating means for dividing the input image signal every predetermined period and for obtaining an information signal composed of a plurality of blocks each of which has the divided image signal and additional information for disabling a normal reproduction of the image signal by adding the additional information to the divided image signal; and recording means for recording the information signal in a recording medium, wherein the normal reproduction of the image signal by said reproducing means from the recording medium is disabled according to the additional information of the plurality of blocks.

11. An apparatus according to claim 10, wherein said generating means comprises compressing means for compressing an information amount of the divided image signal in accordance with MPEG system.

* * * * *

UNITED STATES PATENT AND TRADEMARK OFFICE
CERTIFICATE OF CORRECTION

PATENT NO. : 6,295,099 B1  
DATED : September 25, 2001  
INVENTOR(S) : Koji Takahashi Page 1 of 1

It is certified that error appears in the above-identified patent and that said Letters Patent is hereby corrected as shown below:

Title page,
Item [56] delete "Lunch et al." and insert -- Lynch et al. --.

Signed and Sealed this

Twenty-first Day of May, 2002

Attest:

Attesting Officer

JAMES E. ROGAN  
Director of the United States Patent and Trademark Office